(12) United States Patent
Stevens (10) Patent No.: US 8,490,998 B1
(45) Date of Patent: Jul. 23, 2013

(54) HANDLEBAR ASSEMBLY HAVING A DUAL-PURPOSE ACTUATOR AND VEHICLE INCLUDING SAME

(75) Inventor: Eric B. Stevens, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/568,534

(22) Filed: Aug. 7, 2012

(51) Int. Cl.
*B62K 11/14* (2006.01)
*B62K 21/12* (2006.01)

(52) U.S. Cl.
CPC ........................................ *B62K 21/12* (2013.01)
USPC ......................... 280/288.4; 180/336; 280/274

(58) Field of Classification Search
USPC ................ 74/551.8; 180/336; 280/274, 288.4
See application file for complete search history.

(56) References Cited

U.S. PATENT DOCUMENTS

| 4,188,834 A | | 2/1980 | Wakatsuki et al. |
| 4,629,206 A | * | 12/1986 | Omagari et al. ............... 180/336 |
| 4,667,785 A | | 5/1987 | Toyoda et al. |
| 5,038,881 A | | 8/1991 | Wysocki et al. |
| 6,835,904 B2 | * | 12/2004 | McGuire et al. ........... 200/61.87 |

* cited by examiner

*Primary Examiner* — J. Allen Shriver, II
*Assistant Examiner* — Felicia L Brittman
(74) *Attorney, Agent, or Firm* — Ulmer & Berne LLP (57) ABSTRACT

A handlebar assembly includes a handlebar, a parking brake actuator, and a dual-purpose actuator. The parking brake actuator is pivotally coupled to the handlebar and is pivotable between an activated position and a deactivated position to facilitate selective activation of a vehicular parking brake. The dual-purpose actuator is movably coupled with the parking brake actuator and movable together with the parking brake actuator to facilitate enablement of a reverse gear of a vehicle.

20 Claims, 5 Drawing Sheets

HANDLEBAR ASSEMBLY HAVING A DUAL-PURPOSE ACTUATOR AND VEHICLE INCLUDING SAME

TECHNICAL FIELD

A handlebar assembly of a vehicle includes a parking brake actuator and a dual-purpose actuator associated with the parking brake actuator. The dual-purpose actuator is configured to facilitate selective operation of a vehicular parking brake and selective enabling of a reverse gear.

BACKGROUND

Conventional saddle-type vehicles include handlebars having left and right grips. A parking brake actuator is associated with one of the left grip and right grip and is configured to facilitate manual activation of a parking brake. A reverse enable actuator is associated with one of the left grip and the right grip and is configured to facilitate selective enabling of a reverse gear.

SUMMARY

In accordance with one embodiment, a handlebar assembly comprises a handlebar, a brake lever, a parking brake, a reverse-enable pushbutton, and a dual-purpose actuator. The brake lever is pivotally coupled to the handlebar and is pivotable between an engaged position and a disengaged position. The brake lever is configured to receive an end of a brake cable. The parking brake actuator is pivotally coupled to the handlebar and is pivotable between an activated position and a deactivated position. The reverse-enable pushbutton is coupled with the handlebar and comprises a stem portion that is configured for selective depression to facilitate enablement of a reverse gear of a vehicle. The dual-purpose actuator is pivotable together with the parking brake actuator and configured to facilitate selective depression of the stem portion of the reverse-enable pushbutton.

In accordance with another embodiment, a handlebar assembly comprises a handlebar, a parking brake actuator, and a dual-purpose actuator. The parking brake actuator is pivotally coupled to the handlebar and is pivotable between an activated position and a deactivated position to facilitate selective activation of a vehicular parking brake. The dual-purpose actuator is movably coupled with the parking brake actuator and is movable together with the parking brake actuator. The parking brake actuator is configured to move into the activated position together with the dual-purpose actuator in response to an external force applied to the dual-purpose actuator in a first direction. The dual-purpose actuator is configured to move with respect to the parking brake actuator in response to an external force applied to the dual-purpose actuator in a second direction to facilitate enablement of a reverse gear of a vehicle. The first direction and the second direction are substantially orthogonal to one another.

A handlebar assembly comprises a handlebar, a brake lever, a parking brake actuator, a reverse-enable pushbutton, a control lever, and a dual-purpose actuator. The handlebar has a grip. The brake lever is pivotally coupled to the handlebar adjacent the grip and is pivotable between an engaged position and a disengaged position. The brake lever is configured to receive an end of a brake cable. The parking brake actuator is pivotally coupled to the handlebar adjacent the grip and is pivotable between an activated position and a deactivated position. The reverse-enable pushbutton comprises a stem portion that is supported by the brake lever and is configured for selective depression. The control lever is pivotally coupled to the handlebar adjacent the grip and underlies the brake lever. The control lever defines an aperture and is configured to receive an end of a reverse lockout cable. The dual-purpose actuator is pivotally coupled with the parking brake actuator and is configured to overlie the stem portion when the parking brake actuator is in deactivated position such that depression of the dual-purpose actuator facilitates depression of the stem portion. Depression of the stem portion inserts the stem portion into the aperture in the control lever such that the brake lever and the control lever are pivotable together relative to the handlebar.

BRIEF DESCRIPTION OF THE DRAWINGS

Various embodiments will become better understood with regard to the following description, appended claims, and accompanying drawings wherein:

DETAILED DESCRIPTION

Figure 1:
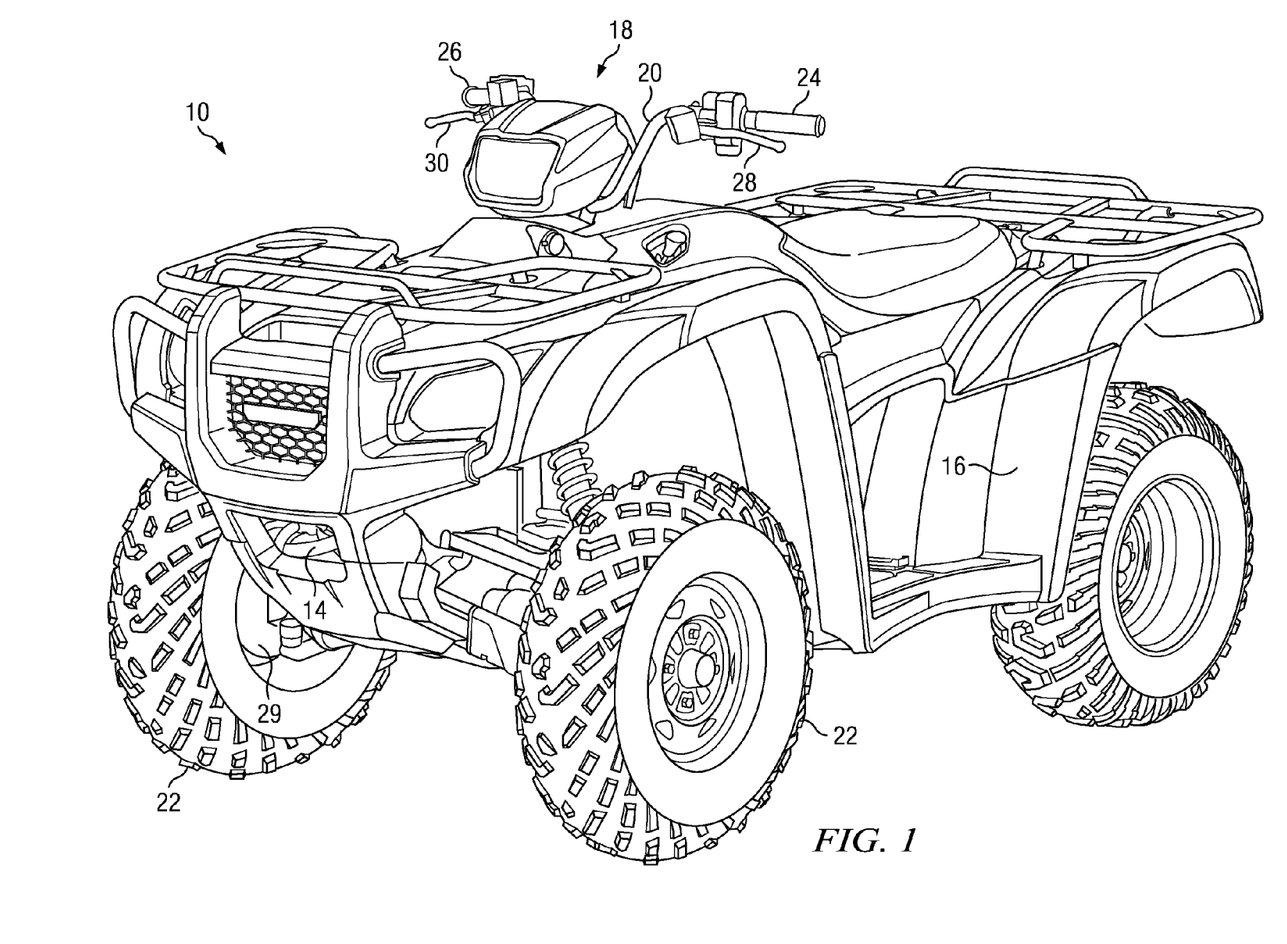
FIG. 1 is a front perspective view depicting a vehicle including a handlebar assembly having a left grip and a right grip in accordance with one embodiment.

The present invention and its operation are hereinafter described in detail in connection with the views and examples of FIGS. 1-7, wherein like numbers indicate the same or corresponding elements throughout the views. As illustrated in FIG. 1, the vehicle 10 can be an all-terrain vehicle (ATV), but in other embodiments, the vehicle 10 can be another type of saddle-type vehicle such as a utility vehicle, or alternatively can be an automobile or a recreational vehicle, for example. The vehicle 10 can include a frame 14 that can be of a tubular construction or can be provided in any of a variety of other suitable arrangements, such as a unibody construction, for example, and can be formed using any of a variety of materials, such as metal or carbon fiber, for example. The frame 14 can support a body 16 which in some embodiments can include a variety of decorative panels.

The vehicle 10 can include a handlebar assembly 18 that includes a set of handlebars 20 coupled with front wheels 22 and configured to facilitate steering of the front wheels 22. The handlebars 20 can include a left grip 24 and a right grip 26 that can accommodate an operator's left and right hands, respectively, for steering the vehicle 10. A brake lever 28 can be provided adjacent the left grip 24 such that an operator can grasp the brake lever 28 with a left hand and can urge the brake lever 28 towards the left grip 24 to facilitate braking of the vehicle 10. The vehicle 10 can include brakes (e.g., 29 in FIG. 1) that are associated with all or some of the wheels and are controlled through operation of the brake lever 28. In one embodiment, the brakes (e.g., 29) can be disc brakes and/or drum brakes which can be actuated mechanically and/or electronically with the brake lever 28. A clutch lever 30 can be provided adjacent the right grip 26 such that an operator can grasp the clutch lever 30 with a right hand and can urge the clutch lever 30 towards the right grip 26 to facilitate engagement of a vehicular clutch and subsequent manual shifting of the vehicle's gears. In an alternative embodiment, a brake lever can be provided adjacent a right grip and a clutch lever can be provided adjacent to a left grip. It will be appreciated that a braking system and a clutch of a vehicle can be selectively operated with any of a variety of other suitable alternative arrangements, such as with handlebar-mounted pushbuttons for controlling the clutch. It will also be appreciated that, in embodiments where the vehicle 10 is provided with an automatic transmission, the clutch lever 30 or other clutch operating device might be omitted entirely.

Figure 2:
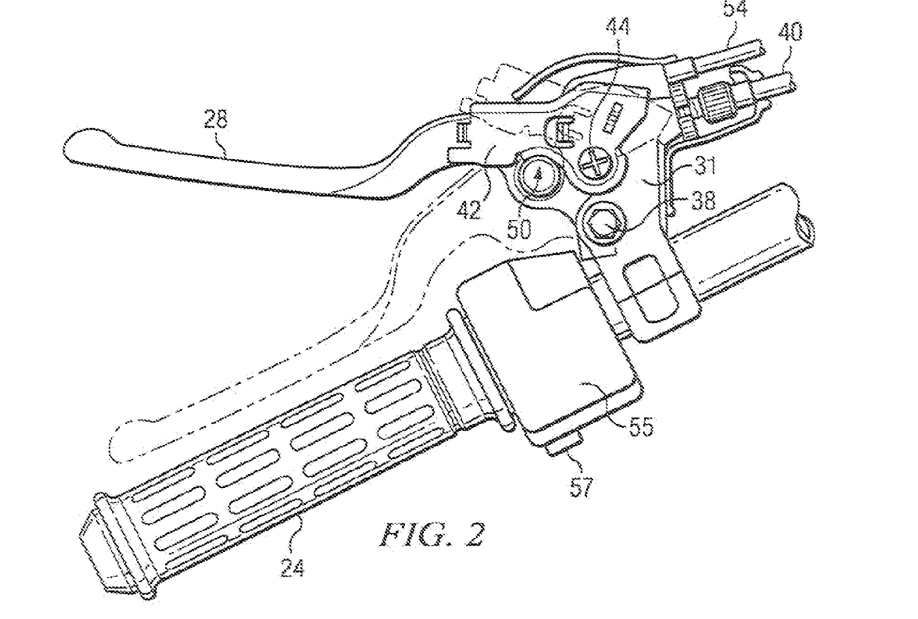
FIG. 2 is a top plan view depicting a portion of the handlebar assembly of FIG. 1 including a brake lever, a parking brake actuator, and a reverse-enable pushbutton associated with the left hand grip, wherein the brake lever is shown in solid lines in a disengaged position and in dashed lines in an engaged position, the parking brake actuator is shown in solid lines in a deactivated position and in dashed lines in an activated position, and a dual-purpose actuator is removed for clarity of illustration.

The brake lever 28 can be pivotally coupled to the handlebars 20. As illustrated in FIG. 2, a brake perch 31 can be coupled to the handlebars 20 and the brake lever 28 can be pivotally coupled to the brake perch 31 by a bolt 38. The brake lever 28 can be pivotable about the bolt 38 between an engaged position (shown in dashed lines in FIG. 2) and a disengaged position (shown in solid lines in FIG. 2). The brake lever 28 can be configured to receive an end of a brake cable 40 that is routed into and supported by the brake perch 31. When the brake lever 28 is pivoted into the engaged position, the brake cable 40 can facilitate operation of the brakes (e.g., 29). In one embodiment, the brake cable 40 can be a Bowden-type cable or other suitable mechanical interface. In other embodiments, a brake cable can be an electrical wire or fiberoptic cable associated with a drive-by-wire or other type of electrical braking system. In such an embodiment, the brake cable can be associated with a sending unit that is configured to transmit an electric signal in response to operation of the brake lever to facilitate operation of the braking system.

Figure 7:
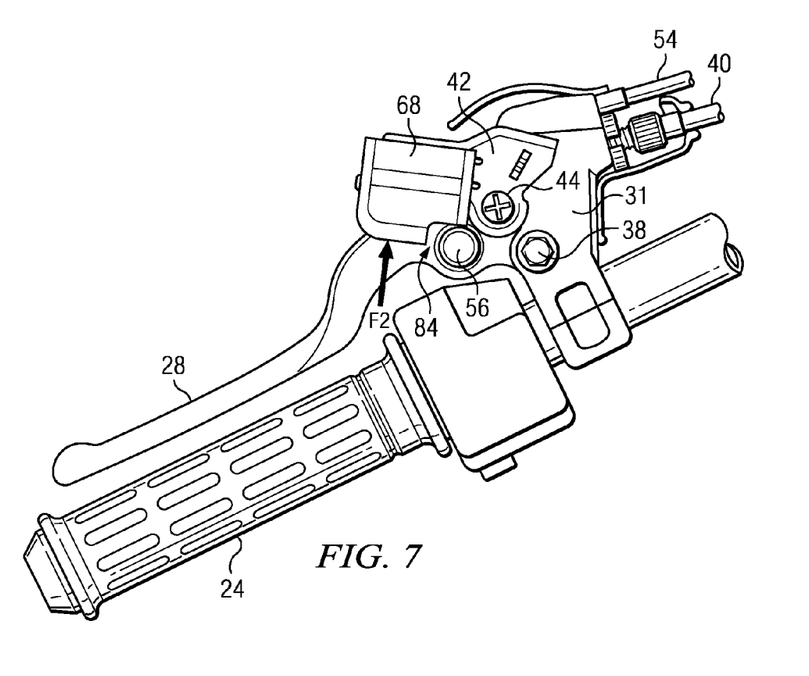
FIG. 7 is a top plan view similar to FIG. 2 but with the brake lever shown in an engaged position and a forward external force applied to the dual-purpose actuator such that the parking brake actuator is in the activated position.

A parking brake actuator 42 can be pivotally coupled to the handlebars 20. As illustrated in FIG. 2, the parking brake actuator 42 can be pivotally coupled to the brake lever 28 by a bolt 44 and can be pivotable about the bolt 44 between an activated position (shown in dashed lines in FIG. 2) and a deactivated position (shown in solid lines in FIG. 2). The parking brake actuator 42 can facilitate activation of a parking brake feature or function for the vehicle 10. For example, to activate the parking brake, the brake lever 28 can first be moved into the engaged position to engage the vehicle's brakes. The parking brake actuator 42 can then be pivoted into the activated position and can interact with the brake perch 31 to prevent the brake lever 28 from moving out of the engaged position and into the disengaged position, as shown in FIG. 7. The vehicle's brakes can accordingly be engaged to serve as the vehicle's parking brake. To disengage the parking brake actuator 42, the brake lever 28 can be urged towards the left grip 24 and the parking brake actuator 42 can be pivoted into the deactivated position. The brake lever 28 can then return to the disengaged position, thereby disengaging the vehicle's braking system. In another embodiment, a separate parking brake can be provided and can be actuated by pivoting a parking brake actuator into the activated position.

In one embodiment, a spring (not shown) can be provided to bias the parking brake actuator 42 into the deactivated position. In such an embodiment, when the parking brake actuator 42 is in the activated position and the brake lever 28 is urged towards the left grip 24, the spring can facilitate automatic pivoting of the parking brake actuator 42 to the deactivated position. In another embodiment, the parking brake actuator 42 can be configured for manual pivoting into the deactivated position, such as by using an operator's thumb.

Figure 4:
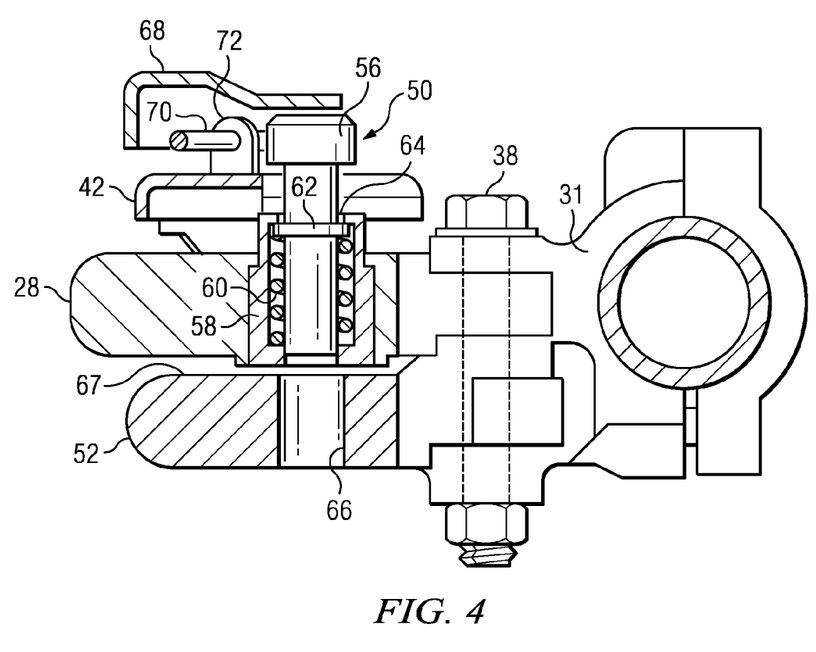
FIG. 4 is a cross-sectional view of the handlebar assembly taken along section line 4-4 in FIG. 3, with a stem portion of the reverse-enable pushbutton shown released and with certain components removed for clarity of illustration.
Figure 5:
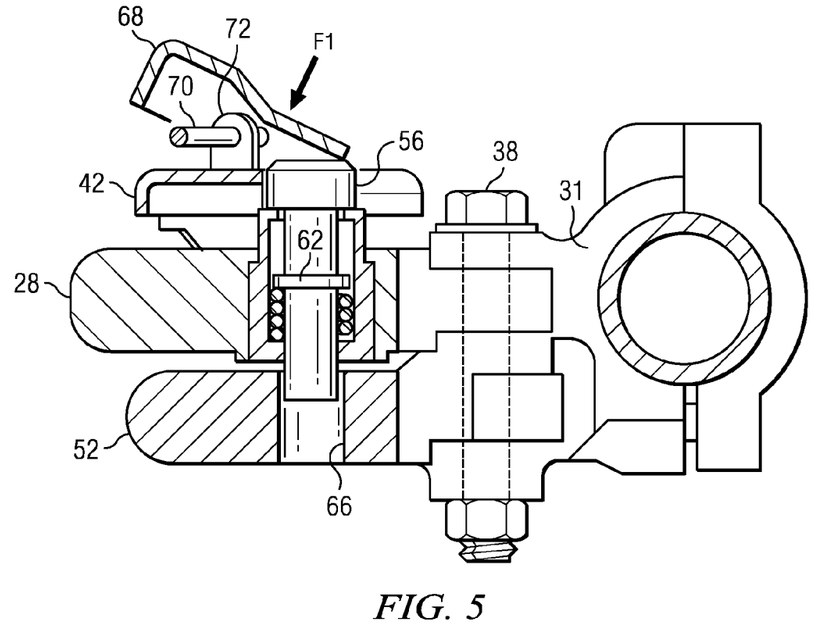
FIG. 5 is a cross-sectional view similar to FIG. 4, but with a downward external force shown applied to the dual-purpose actuator such that the dual-purpose actuator is in a depressed position with the stem portion depressed and inserted into a control lever.

As illustrated in FIGS. 2 and 5, the handlebar assembly 18 can include a reverse-enable pushbutton 50 and a control lever 52. The control lever 52 can be pivotally coupled with the handlebars 20 and can underlie the brake lever 28. In one embodiment, as illustrated in FIGS. 4 and 5, the control lever 52 can be pivotally coupled to the brake perch 31 by the bolt 38 such that both the brake lever 28 and the control lever 52 are pivotable about the bolt 38.

The control lever 52 can be operable to facilitate selective disabling of the vehicle's reverse gear. The control lever 52 can be configured to receive an end of a reverse lockout cable 54 (FIG. 2) that is routed into and is supported by the brake perch 31. The other end of the reverse lockout cable 54 can be associated with a reverse lockout mechanism (not shown) that is associated with the vehicle's transmission and is operable through pivoting of the control lever 52.

A reverse lockout mechanism can be any of a variety of configurations or arrangements that selectively prohibit shifting of the vehicle 10 into a reverse gear. In one embodiment, the reverse lockout mechanism can be a mechanical device that is linked to the vehicle's shifting selector, shifting linkage, or other shifting component for shifting of the vehicle into a reverse gear. In such an embodiment, the reverse lockout cable 54 can be a Bowden-type cable or other suitable mechanical interface that mechanically links the control lever 52 to the reverse lockout mechanism. The control lever 52 can accordingly selectively mechanically actuate the reverse lockout mechanism, which can disable/enable the mechanical link between the shifting selector and the transmission to disable/enable the vehicle's reverse gear.

Figure 3:
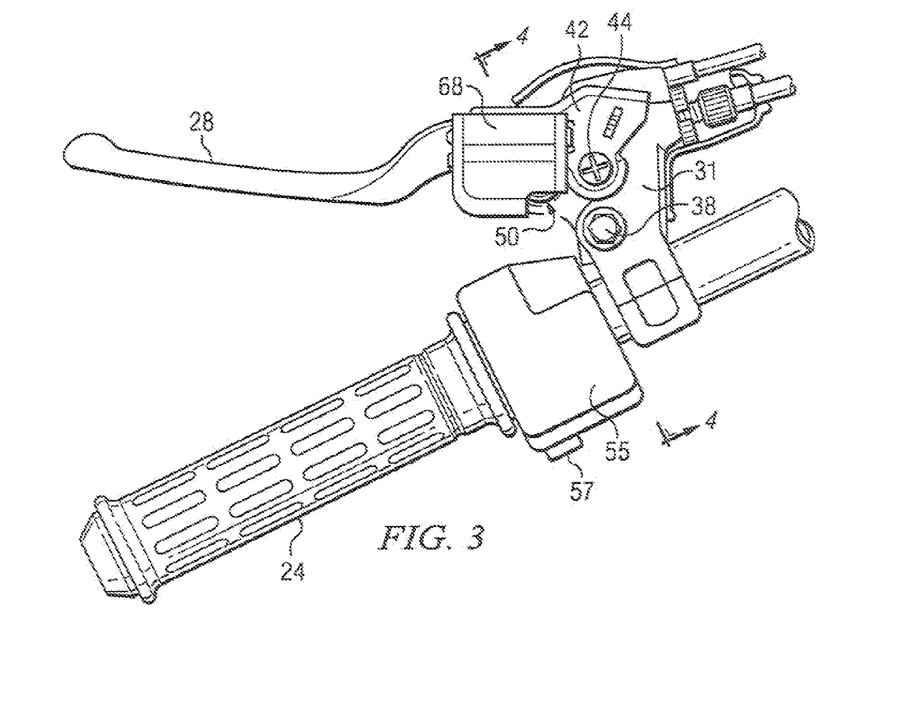
FIG. 3 is a top plan view similar to FIG. 2 but with the dual-purpose actuator coupled to the parking brake actuator and with the dashed lines removed.

In another embodiment, the reverse lockout mechanism can include an electromechanical device, such as a relay or a solenoid, for example, that is associated with an electric-shift type transmission. The electric-shift type transmission can have a transmission control unit and/or a shift control module that facilitates electronic shifting of the transmission. An electronic shift selector 55, as illustrated in FIGS. 2 and 3, can be in electrical communication with the transmission control unit and can include a plurality of pushbuttons (e.g., 57) that facilitate pushbutton shifting with the operator's left thumb or finger. In such an embodiment, the reverse lockout cable can be an electrical wire or fiberoptic cable that facilitates communication between a sending unit and the reverse lockout mechanism. Operation of the control lever 52 can activate the sending unit to send an electrical signal that facilitates actuation of the reverse lockout mechanism or other suitable electronic device (e.g., the transmission control unit and/or the shift control mechanism) to electronically disable/enable shifting of the transmission into a reverse gear.

The reverse-enable pushbutton 50 can be coupled with the handlebars 20 and can include a stem portion 56 that is configured for selective depression. As illustrated in FIGS. 4 and 5, the stem portion 56 can be selectively depressed by an operator such that a portion of the stem portion 56 is inserted into an aperture 66 defined by the control lever 52. When the stem portion 56 is not depressed (e.g., released), as illustrated in FIG. 4, the brake lever 28 is free to pivot with respect to the control lever 52. The control lever 52 can accordingly be provided in a reverse-lockout position (FIG. 4) thereby disabling the vehicle's reverse gear.

When the stem portion 56 is inserted into the aperture 66, as shown in FIG. 5, the brake lever 28 and the control lever 52 can be pivotally coupled together such that the control lever 52 can be controlled by, and can pivot together with, the brake lever 28. The stem portion 56 can accordingly be depressed by an operator to facilitate enablement of a reverse gear of the vehicle 10. In one embodiment, when the stem portion 56 is depressed, as illustrated in FIG. 5, an operator can selectively enable the reverse gear through use of the brake lever 28. To enable the reverse gear, the brake lever 28 can be provided in the disengaged position and the stem portion 56 can be depressed and inserted into the aperture 66, as illustrated in FIG. 5, to pivotally couple the brake lever 28 and the control lever 52 together. The brake lever 28 can then be pulled into the engaged position which can correspondingly pivot the control lever 52 into a reverse enable position (not shown), thereby enabling the vehicle's reverse gear. The brake lever 28 can be held in the engaged position while the vehicle 10 is shifted into the reverse gear. The brake lever 28 can simultaneously apply the vehicle's brakes which can stop or slow the vehicle 10 enough to permit effective shifting into the reverse gear and without stressing and/or damaging the transmission. Once the vehicle 10 is successfully shifted into the reverse gear, the brake lever 28 can be released to release the vehicle's brakes. The stem portion 56 can then return to the released position (FIG. 4) which can free the brake lever 28 from the control lever 52. With the control lever 52 returned to the reverse lockout position, the vehicle can continue in a reverse gear until the vehicle is shifted out of the reverse gear. However, re-entry into the reverse gear can require reinsertion of the stem portion 56 into the aperture 66 and movement of the brake lever 28 to the engaged position.

As illustrated in FIGS. 4 and 5, the stem portion 56 can be supported with respect to the brake lever 28 by a sleeve 58. A spring 60 can bias the stem portion 56 into a released position, as illustrated in FIG. 4. The spring 60 can be sandwiched between an end wall of the sleeve 58 and a flange 62 that extends radially from the stem portion 56. When the stem portion 56 is depressed, as illustrated in FIG. 5, the spring 60 can be compressed by the flange 62. When the stem portion 56 is in the released position, as illustrated in FIG. 4, the flange 62 can contact an upper shoulder 64 of the sleeve 58 to stop the stem portion 56 from moving further upwardly. In such an embodiment, when the stem portion 56 is depressed and the brake lever 28 is moved to the engaged position to enable the reverse gear, the stem portion 56 can automatically return to the released position once the brake lever 28 is released. It will be appreciated that, additionally or alternatively, the reverse-enable pushbutton 50 can be provided with a manual release (not shown) that retains the stem portion 56 in the depressed position until the manual release is actuated to release the stem portion 56 from its depressed position.

In one embodiment, the upper shoulder 64 can be a threaded cap that can be removed to facilitate selective removal of the spring 60 and/or the stem portion 56 from the remainder of the sleeve 58. In other embodiments, the upper shoulder 64 can be formed by crimping, through use of a circlip, or otherwise. The sleeve 58 can be retained to the brake lever 28 in a friction fit, a press fit, a threaded fit, through use of some other mechanical interface, or any of a variety of other suitable arrangements.

In one embodiment, the control lever 52 can be biased into the reverse-lockout position by a torsion spring or other biasing arrangement (not shown), located at the handlebars 20, at the transmission, or otherwise. When the stem portion 56 is inserted into the aperture 66 in the control lever 52, and the brake lever 28 is then urged away from the disengaged position, the control lever 52 can frictionally engage the stem portion 56 to retain it in the depressed position. Once the brake lever 28 and/or the stem portion 56 are released, the control lever 52 can automatically return to the reverse-lockout position to disable the reverse gear. It will be appreciated that the control lever 52 and/or the stem portion 56 can be selectively biased with any of a variety of suitable alternative biasing arrangements.

When the stem portion 56 is depressed with either the brake lever 28 or the control lever 52 out of position, the stem portion 56 can be prevented from being inserted into the aperture 66. For example, when the control lever 52 is in the reverse-lockout position and the brake lever 28 is in the disengaged position, the stem portion 56 and the aperture 66 are substantially aligned. If the brake lever 28 is then pivoted with respect to the control lever 52 and away from the disengaged position (e.g., to apply the brakes), the stem portion 56 and the aperture 66 can become misaligned. If the stem portion 56 is then depressed, such as by an inadvertent depression with an operator's thumb or passing debris, the stem portion 56 can contact a smooth top surface 67 (FIG. 4) of the control lever 52 which prevents the stem portion 56 from being inserted into the control lever 52 and possibly enabling the reverse gear. Once the brake lever 28 is returned to the disengaged position, the stem portion 56 and the aperture 66 can again move into alignment with one another thereby permitting insertion of the stem portion 56 into the aperture 66.

Figure 6:
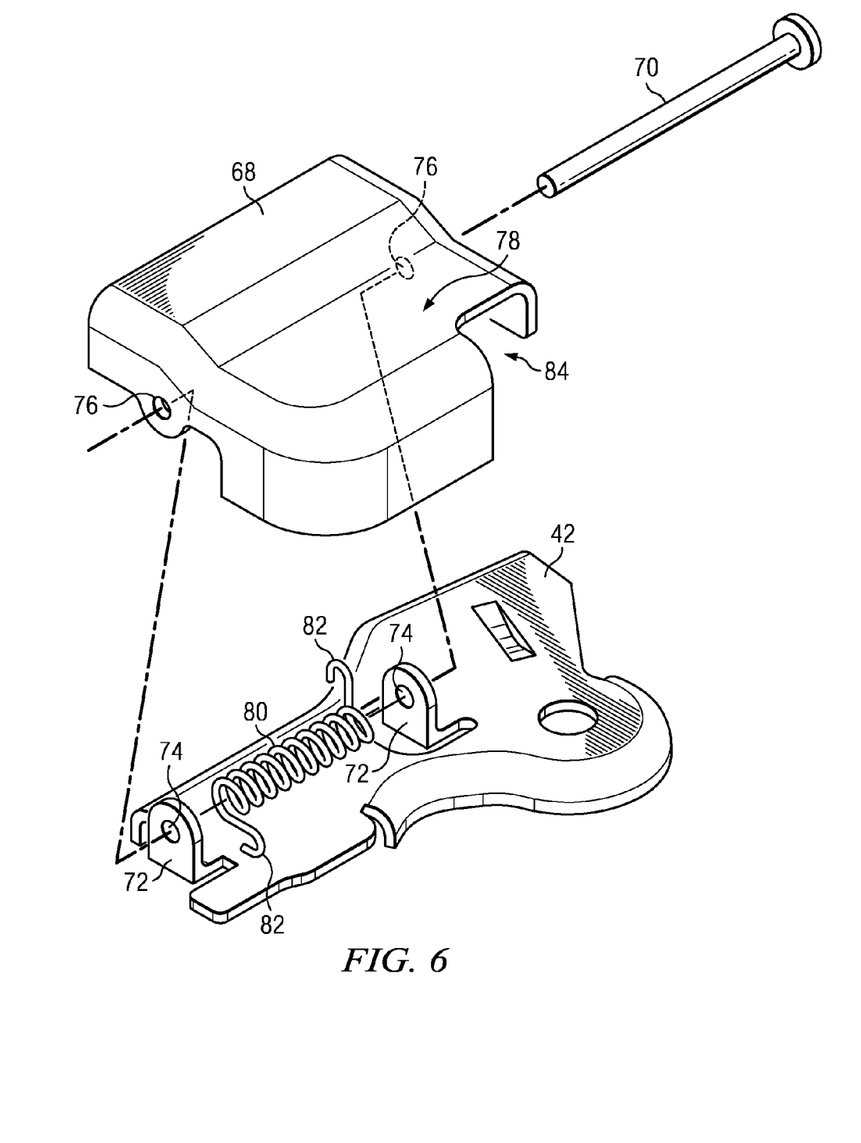
FIG. 6 is an exploded perspective view depicting the parking brake actuator, the dual-purpose actuator, a pin, and a spring, and shown apart from the rest of the handlebar assembly for clarity of illustration.

A dual-purpose actuator 68 can be movably coupled with the parking brake actuator 42 and can be operable to facilitate selective operation of the reverse-enable pushbutton 50. In one embodiment, as illustrated in FIGS. 3-6, the dual-purpose actuator 68 can be pivotally coupled to the parking brake actuator 42 by a pin 70. As illustrated in FIG. 6, the parking brake actuator 42 can include a pair of pin supports 72 that define respective pin apertures 74 for receiving the pin 70. The pin apertures 74 can correspond with pin apertures 76 defined by the dual-purpose actuator 68. The pin 70 can extend through each of the pin apertures 74, 76 to pivotally couple the dual-purpose actuator 68 to the parking brake actuator 42.

The dual-purpose actuator 68 can be configured to pivot with respect to the parking brake actuator 42 between a released position (FIG. 4) and a depressed position (FIG. 5). Movement of the dual-purpose actuator 68 into the depressed position can facilitate depression of the stem portion 56. For example, to depress the stem portion 56, an operator can press downwardly on the dual-purpose actuator 68 (e.g., with a thumb or other part of the hand), to exert a downward external force F1 as illustrated in FIG. 5, onto the dual-purpose actuator 68. In response to the downward external force F1, the dual-purpose actuator 68 can pivot into the depressed position thereby urging the stem portion 56 into the depressed position.

In one embodiment, as illustrated in FIG. 6, the handlebar assembly 18 can include a torsion spring 80 that is configured to bias the dual-purpose actuator 68 into the released position.

The torsion spring 80 can be supported on the pin 70 such that it is interposed between the parking brake actuator 42 and the dual-purpose actuator 68. The torsion spring 80 can have a pair of arm portions 82. One of the arm portions 82 can interact with the parking brake actuator 42 and the other of the arm portions 82 can interact with the dual-purpose actuator 68. When the dual-purpose actuator 68 is moved into the depressed position, one of the arm portions 82 can rotate with respect to the other arm portion 82 about the pin 70 and can bias the dual-purpose actuator 68 toward the released position. In other embodiments, a handlebar assembly can include any of a variety of suitable alternative arrangements for biasing a dual-purpose actuator. In still other embodiments, a handlebar assembly might not include a biasing member for the dual-purpose actuator 68 (e.g., torsion spring 80) but instead might rely on the spring 60 of the reverse-enable pushbutton 50 to bias the dual-purpose actuator 68 into the released position. It will be appreciated that, in some embodiments, the dual-purpose actuator 68 might not move to the depressed position in response to the downward external force F1 until the force is at least sufficient enough to overcome the biasing force from the torsion spring 80 and/or the spring 60.

The dual-purpose actuator 68 can be movable together with the parking brake actuator 42. In one embodiment, as shown in FIGS. 3 and 7, the dual-purpose actuator 68 can be pivotable together with the parking brake actuator 42 (e.g., about the bolt 44) such that the parking brake actuator 42 can be pivoted by pressing the dual-purpose actuator 68 forwardly. For example, to facilitate movement of the parking brake actuator 42 into the activated position, an operator can press forwardly on the dual-purpose actuator 68 (e.g., with a thumb or other part of the hand) to exert a forward external force F2, as illustrated in FIG. 7, onto the dual-purpose actuator 68. In response to the forward external force F2, the parking brake actuator 42 can pivot into the activated position, as illustrated in FIG. 7. It will be appreciated that, in some embodiments, the parking brake actuator 42 might not move in response to the forward external force F2 on the dual-purpose actuator 68 until the force is sufficient enough to overcome the opposing force from a torsion spring associated with the parking brake actuator 42. Although the downward and forward external forces F1, F2 are shown to be substantially orthogonal to one another, it will be appreciated that respective external forces can be applied to a dual-purpose actuator in any of a variety of different directions to facilitate operation of a parking brake and enablement a reverse gear.

As illustrated in FIGS. 6-7, the dual-purpose actuator 68 can define a notched portion 84 that is configured to permit selective passage of the stem portion 56 therethrough. As illustrated in FIG. 7, when the brake lever 28 is engaged and the parking brake actuator 42 is moved to the activated position to set the parking brake, the stem portion 56 can pass through the notched portion 84 such that the dual-purpose actuator 68 no longer overlies the stem portion 56. The notched portion 84 can be configured to allow the dual purpose actuator 68 to move forwardly without contact with the stem portion 56.

The dual-purpose actuator 68 can be readily accessible to an operator's hand from the left grip 24. The dual-purpose actuator 68 can accordingly be operated with one hand such as with an operator's thumb or finger and without removing the hand from the left grip 24. The operator can select between operating the parking brake or enabling the reverse gear by simply pushing the dual-purpose actuator 68 either forwardly or downwardly, respectively, which can be less cumbersome and more time efficient than locating and operating of the parking brake actuator 42 and the stem portion 56 individually.

The dual-purpose actuator 68 can facilitate one-handed operation of the parking brake and enabling of the reverse gear from a common location on the handlebars 20. For example, to set the vehicle's parking brake, the operator can grasp and pull the brake lever 28 into the engaged position and can then push the dual-purpose actuator 68 forwardly entirely with the left hand. Similarly, to shift the vehicle 10 into reverse, the operator can push the dual-purpose actuator 68 downwardly, pull the brake lever 28 into the engaged position, and shift the transmission into reverse from the shift selector 55, entirely with the left hand. This can allow the operator's right hand to remain free and in contact with the right grip 26 to maintain effective control of the handlebars 20 and/or to operate other devices such as the clutch lever 30, for example.

The dual-purpose actuator 68 can also be provided with instructions printed on a visible surface that reminds the operator of the appropriate direction in which to move the dual-purpose actuator 68. The operator can therefore readily set the parking brake or enable the reverse gear from the dual purpose actuator 68 efficiently and without confusion. The dual-purpose actuator 68 can conceal certain areas of the parking brake actuator 42 and/or stem portion 56 and can have a contoured shape to provide effective aesthetics for the handlebars 20.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A handlebar assembly comprising:
   a handlebar;
   a brake lever pivotally coupled to the handlebar and pivotable between an engaged position and a disengaged position, the brake lever being configured to receive an end of a brake cable;
   a parking brake actuator pivotally coupled to the handlebar and pivotable between an activated position and a deactivated position;
   a reverse-enable pushbutton coupled with the handlebar and comprising a stem portion that is configured for selective depression to facilitate enablement of a reverse gear of a vehicle; and
   a dual-purpose actuator pivotable together with the parking brake actuator and configured to facilitate selective depression of the stem portion of the reverse-enable pushbutton.

2. The handlebar assembly of claim 1 wherein, when the stem portion is depressed, the brake lever is configured to control enablement of a reverse gear of the vehicle.

3. The handlebar assembly of claim 2 further comprising a control lever pivotally coupled with the handlebar and configured to receive an end of a reverse lockout cable, the control lever defining an aperture, wherein depression of the stem portion inserts the stem portion into the aperture in the control lever such that the brake lever and the control lever are pivotable together relative to the handlebar.

4. The handlebar assembly of claim 3 wherein the dual-purpose actuator is pivotally coupled to the parking brake actuator and is pivotable with respect to the parking brake actuator between a released position and a depressed position.

5. The handlebar assembly of claim 3 further comprising a spring configured to bias the stem portion away from the control lever.

6. The handlebar assembly of claim 4 wherein the dual-purpose actuator defines a notched portion that is configured to permit selective passage of the stem portion therethrough.

7. The handlebar assembly of claim 6 wherein the dual-purpose actuator overlies a portion of the stem portion when the parking brake actuator is in the deactivated position.

8. The handlebar assembly of claim 4 further comprising a torsion spring configured to bias the dual-purpose actuator away from its depressed position.

9. The handlebar assembly of claim 1 wherein pivoting the parking brake actuator into the activated position with the brake lever in the engaged position retains the brake lever in the engaged position.

10. The handlebar assembly of claim 1 wherein the parking brake actuator, when moved to the activated position with the brake lever in the engaged position, is configured to retain the brake lever in the engaged position.

11. A handlebar assembly comprising:
a handlebar;
a parking brake actuator pivotally coupled to the handlebar and pivotable between an activated position and a deactivated position to facilitate selective activation of a vehicular parking brake; and
a dual-purpose actuator movably coupled with the parking brake actuator and movable together with the parking brake actuator, wherein:
the parking brake actuator is configured to move into the activated position together with the dual-purpose actuator in response to an external force applied to the dual-purpose actuator in a first direction;
the dual-purpose actuator is configured to move with respect to the parking brake actuator in response to an external force applied to the dual-purpose actuator in a second direction to facilitate enablement of a reverse gear of a vehicle; and
the first direction and the second direction are substantially orthogonal to one another.

12. The handlebar assembly of claim 11 wherein the dual-purpose actuator is pivotally coupled to the parking brake actuator and is pivotable with respect to the parking brake actuator between a released position and a depressed position.

13. The handlebar assembly of claim 12 further comprising a reverse-enable pushbutton having a stem portion that is configured for depression by the dual-purpose actuator when the dual-purpose actuator is pivoted into the depressed position, wherein depression of the stem portion facilitates enablement of a reverse gear of a vehicle.

14. The handlebar assembly of claim 13 wherein the dual-purpose actuator defines a notched portion that is configured to permit selective passage of the stem portion when the parking brake actuator is moved into the actuated position.

15. A handlebar assembly comprising:
a handlebar having a grip;
a brake lever pivotally coupled to the handlebar adjacent the grip and pivotable between an engaged position and a disengaged position, the brake lever being configured to receive an end of a brake cable;
a parking brake actuator pivotally coupled to the handlebar adjacent the grip and pivotable between an activated position and a deactivated position;
a reverse-enable pushbutton comprising a stem portion that is supported by the brake lever and is configured for selective depression;
a control lever pivotally coupled to the handlebar adjacent the grip and underlying the brake lever, the control lever defining an aperture and configured to receive an end of a reverse lockout cable; and
a dual-purpose actuator pivotally coupled with the parking brake actuator and configured to overlie the stem portion when the parking brake actuator is in deactivated position such that depression of the dual-purpose actuator facilitates depression of the stem portion;
wherein depression of the stem portion inserts the stem portion into the aperture in the control lever such that the brake lever and the control lever are pivotable together relative to the handlebar.

16. The handlebar assembly of claim 15 wherein the stem portion is prevented from being inserted into the aperture when either the control lever or the brake lever is out of position.

17. The handlebar assembly of claim 15 wherein the dual-purpose actuator defines a notched portion that is configured to permit selective passage of the stem portion when the parking brake actuator is moved into the actuated position.

18. The handlebar assembly of claim 15 further comprising:
a torsion spring configured to bias the dual-purpose actuator away from its depressed position; and
a spring configured to bias the stem portion away from the control lever.

19. The handlebar assembly of claim 15 wherein the parking brake actuator, when moved to the activated position with the brake lever in the engaged position, is configured to retain the brake lever in the engaged position.

20. A saddle-type vehicle comprising the handlebar assembly of claim 15 in combination with:
a frame;
a pair of wheels rotatably supported with respect to the frame;
a brake associated with at least one of the wheels; and
a brake cable coupled with the brake and the brake lever.

* * * * *